United States Patent Office 3,278,120
Patented Oct. 11, 1966

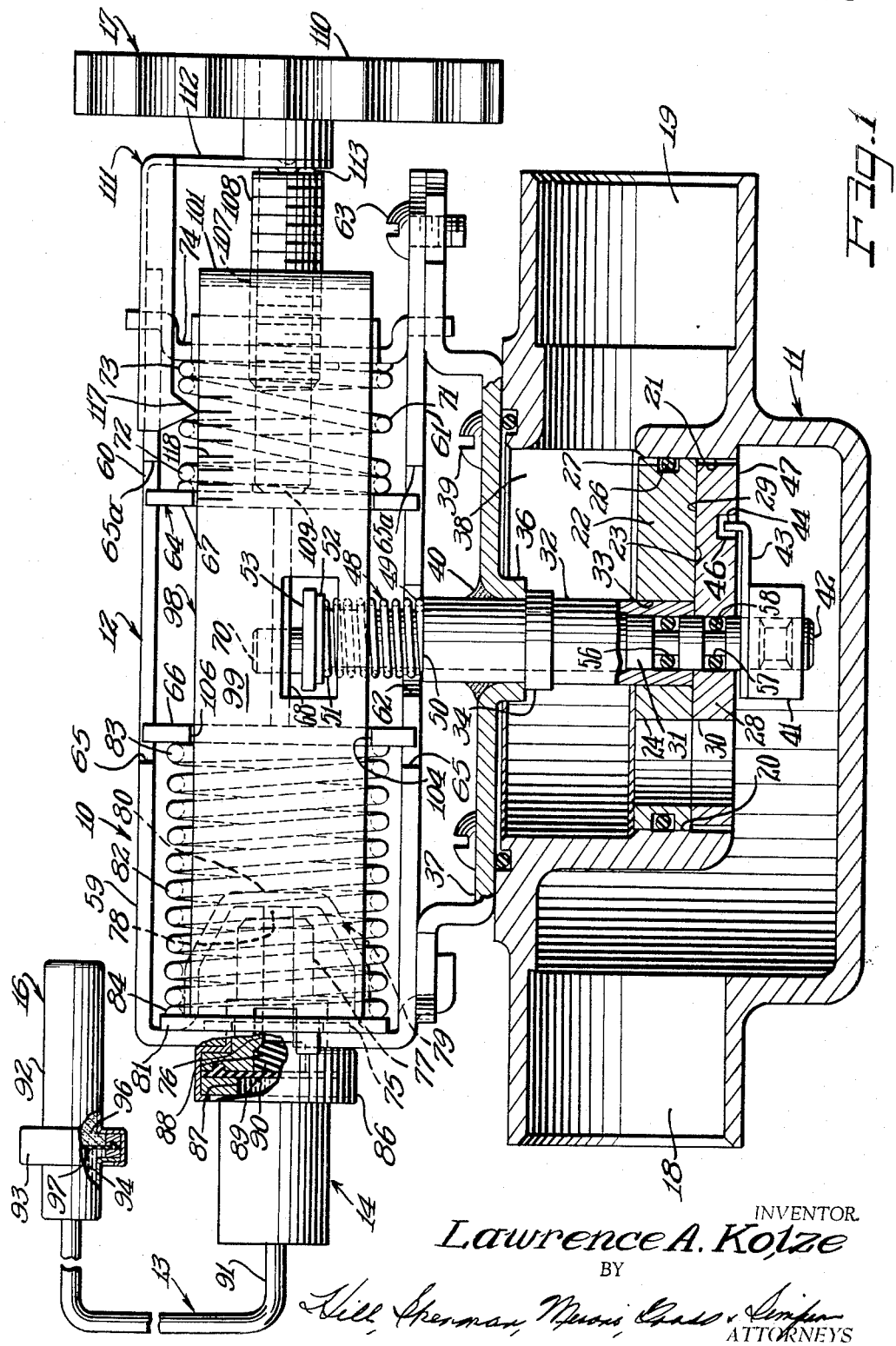

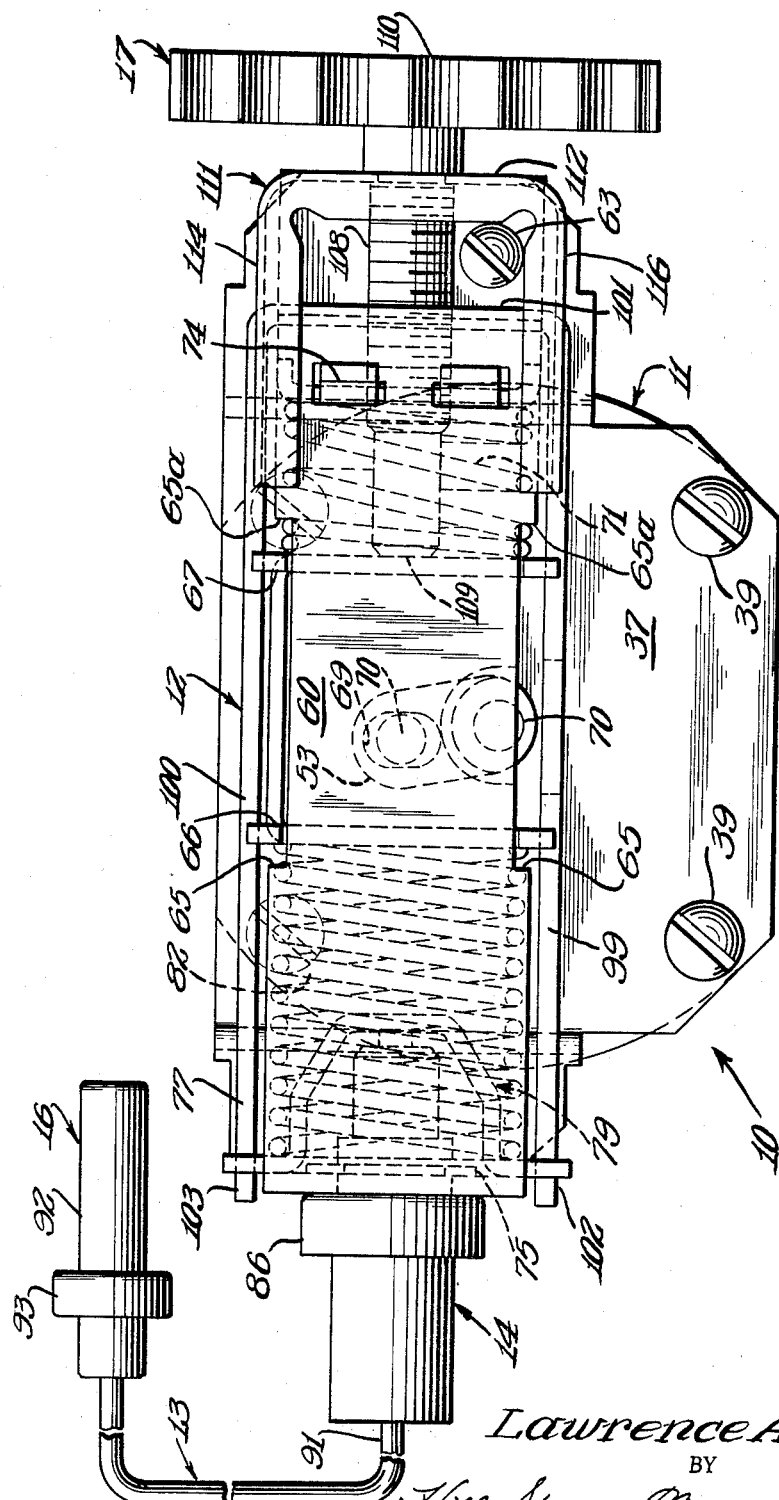

3,278,120
THERMOSTATIC FLUID FLOW CONTROL VALVE
Lawrence A. Kolze, Bensenville, Ill., assignor to The Dole Valve Company, Morton Grove, Ill., a corporation of Illinois
Filed June 22, 1964, Ser. No. 376,695
4 Claims. (Cl. 236—98)

This invention relates generally to fluid flow control valves and more particularly relates to a rotary valve which is especially suited for use in a liquid heating or cooling system and which comprises a temperature sensitive valve actuator situated remote from the valve body for controlling flow through the valve in response to temperature ambient the actuator and also includes manually adjustable means mounted on the valve body for controlling flow through the valve for any given temperature ambient the temperature sensitive actuator.

Fluid flow control valves are commonly employed in liquid heating and cooling systems whereby the temperature of the conditioned space is controlled by regulating the flow of liquid or heating medium through heat transfer apparatus such as convectors or coils situated within or connected to the conditioned space. The flow rate of the liquid medium required to maintain a predetermined temperature in the conditioned space is generally controlled by means of a fluid flow control valve connected to the heat transfer apparatus and is a function of, among other things, the temperature of the liquid medium as well as the capacity of the heat transfer apparatus employed in the system.

Operation of the flow control valve may be controlled by an actuator connected to the valve which senses and responds to temperature, for example, the temperature of the conditioned space. However, if the valve actuator is situated closely adjacent the valve and the heat transfer apparatus connected thereto, the temperature ambient the actuator will not correspond to the temperature of the conditioned space, but will instead be subjected to the exaggerated temperature immediately adjacent the heat transfer apparatus.

In accordance with the principles of the present invention, a temperature sensitive valve actuator is provided with means for remote positioning, thereby avoiding the possibly extreme ambient temperature at the valve itself. The temperature sensitive actuator of this invention is self-contained, and includes a fluid control circuit for actuating the valve, thereby precluding the necessity of using electric energy as a source of power for the valve.

The valving mechanism of the invention is of the rotary type, the operation of which is relatively insensitive to the pressure of the fluid controlled by the valve. A valve operating assembly is mounted on the valve body and comprises a linearly movable force transmitting member connected in fluid communication to the temperature sensitive valve actuator and suitable linkage apparatus for translating said linear movement to rotary movement for operating the valve mechanism.

In addition, the present invention contemplates the provision of manually adjustable means mounted on the valve operating assembly whereby positioning of the valving mechanism and correspondingly flow through the valve can be manually regulated for any given temperature ambient the remotely situated temperature sensitive actuator.

It is, therefore, an object of the present invention to provide a fluid flow control valve having a remotely positioned self-contained temperature sensitive actuator connected thereto for varying the flow through the valve in response to variations in temperature ambient the actuator and having manually adjustable means mounted on the valve for regulating the flow through the valve for any given temperature ambient the temperature sensitive actuator.

Another object of the present invention is to provide a rotary type fluid control valve which is relatively insensitive to the pressure of the controlled fluid and a pair of actuators for controlling the valve, one of the actuators being of the temperature sensitive type situated remotely from the valve body and responsive to temperature surrounding the actuator and the other actuator being of the manually adjustable type for regulating the effect of the temperature sensitive actuator on the valve.

And yet another object of the present invention is to provide a fluid flow control valve incorporating a rotary type valve mechanism and a valve operating assembly mounted on the valve for controlling the operation of the valve mechanism and comprising a linearly movable fluid pressure operated force transmitting member adapted for connection to a remotely positioned temperature sensitive actuator, suitable linkage apparatus for translating said linear movement to rotary movement and a manually adjustable mechanism for regulating the setting of the valve mechanism for any given temperature at the temperature sensitive actuator.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

On the drawings:

FIGURE 1 is a vertical sectional view with parts shown in elevation of a fluid flow control valve including a remotely situated temperature sensitive actuator and a manually adjustable regulating mechanism mounted on the valve and constructed in accordance with the principles of the present invention; and FIGURE 2 is a top plan view of the control valve of FIGURE 1.

As shown on the drawings:

Although the principles of the present invention are of utility in any fluid flow control valve, a particularly useful application is made to a fluid control valve especially suited for use in liquid heating or coolings systems and an illustrative embodiment herein shown consists of a rotary type valve indicated generally at reference numeral 10 in the drawings and having a valve body 11 and a valve operating or force transmitting assembly mounted thereon as at 12.

The valve operating assembly 12 operates the valve 10 in response to variations in fluid pressure in a fluid control circuit 13 which is filled with a non-compressible liquid which acts on a pressure sensitive force transmitting member 14. The fluid pressure in the circuit 13 is a function of the temperature surrounding a remotely situated temperature sensitive actuator 16 connected in fluid communication to the circuit 13. Variations in temperature ambient the actuator 16 thereby effect the pressure of the fluid in the circuit 13 which, in turn, controls the operation of the fluid control valve 10 through the operating assembly 12.

In order to vary the effect of the actuator 16 on the valve 10, and to regulate the flow of fluid through the valve for any given temperature ambient the actuator 10, a manually adjustable actuator or regulating mechanism 17 is mounted on the valve operating assembly 12 and interconnected thereby to the force transmitting member 14.

It will be noted that the temperature sensitive actuator 16 which may conveniently be situated within the conditioned space or one, the temperature of which is controlled by the valve 10, is a sealed unit having no provision for adjustment and responds solely to variations in temperature ambient the actuator. The manually adjustable regulating mechanism 17, on the other hand, may be adjusted by the occupant of the conditioned space, is insensitive to variations in temperature and operates solely through manual adjustment thereof. As will be apparent hereinafter, adjustment of the mechanism 17 varies the effect or influence of the actuator 16 on the power unit 14 and regulates the rate of flow through the valve 10 for any given temperature ambient the actuator 16, thereby regulating, in effect, the temperature of the conditioned space by the occupant thereof.

Referring to FIGURE 1, the valve body 11 includes an inlet passage 18, an outlet passage 19 and a flow passage 20 interconnecting and extending transversely to the inlet and outlet passage and formed by a cylindrical inner wall 21.

Situated within the flow passage 20 and confined therein by suitable means such as a press-fit connection is an annular or disc-shaped valve seating member 22 having a flat radially extending valve seating surface formed thereon as at 23 and having extending therethrough in axially offset relation a cylindrical aperture 24. It will be observed that an O ring 26 is situated within a groove 27 formed in the periphery of the valve seating member 22 for sealing engagement with the inner wall 21.

A complimentarily shaped rotary valve member 28 is positioned adjacent the valve seating member 22 and comprises a seating surface 29 in abutting engagement with the seating surface 23 of the seating member 22. The valve member 28 is rotatable within the flow passage 20 and has formed therein an aperture 30 alignable with the aperture 24 of the seating member 22 when the valve member 28 is in a predetermined angular position for establishing a flow path between the inlet 18 and the outlet 19.

In order to provide rotary movement to the valve member 28 for controlling fluid flow through aperture 30, an axially extending valve stem 31 is securely fastened thereto by suitable means such as a press-fit connection, and is journalled for rotation in a valve stem sleeve member 32 which extends through an aperture 33 formed in the seating member 22.

In order to prevent the sleeve 32 from traveling axially outwardly relative to the valve body 11, a shoulder portion 34 is formed thereon for abutting an inturned flange portion 36 of a cover plate member 37 which encloses an internal chamber 38 formed within the valve body 11. The cover plate 37 is connected in fixed assembly to the valve body 11 by a plurality of fasteners as at 39 which extend through the plate and into the valve body. The plate 37 is also fixedly secured to the sleeve 32 by means of a welded joint as at 40.

In order to maintain abutting engagement of the valve member 28 against the seating member 22, and to provide for corotation of the valve member and the valve stem 31, an enlarged diameter head cap 41 is fixedly secured for corotation to an end portion 42 of the valve stem 31 and comprises a radially extending finger member 43 having a tang 44 projecting into a socket or detent 46 formed in a back face 47 of the valve member 28. The cap 41 is urged into abutting engagement with the valve member 28 by means of a biasing member acting on the valve stem 31 and which may conveniently take the form of a coil spring 48 abutting at one end 49 thereof against an end surface 50 of the sleeve 32 and abutting at an opposite end 51 thereof against a shoulder or retainer flange 52 of a crank arm 53 extending laterally or radially from a top end portion of a valve stem 31. The spring 48 is selected to provide sufficient biasing force between the valve member 28 and the seating member 22 to prevent leakage past the interfacing seating surfaces thereof. It will be observed that a pair of circumferential grooves 56 and 57 are formed in the lower portion of the valve stem 31 and confine respectively an O ring as at 58 for preventing leakage through the sleeve 32 past the valve stem 31.

Referring to FIGURES 1 and 2, the valve operating assembly 12 is particularly characterized as comprising a frame 59 having a pair of leg members 60 and 61 extending transversely to the valve stem 31. The leg member 61 is apertured as at 62 for receiving the valve stem and the coil spring 48, and is connected in fixed assembly to the cover plate 37 by means of a plurality of fasteners as at 63.

In order to provide rotary movement to the valve stem 31, a pin guide member 64 is confined between the leg members 60 and 61 of the frame 59 for slidable linear or translatory movement relative to the leg members and in a direction transverse to the axis of the valve stem 31. The pin guide member 64 includes a pair of spaced parallel motive plates 66 and 67 which extend parallel to the axis of the valve stem and a pin drive plate 68 connected to the motive plates 66 and 67 and having formed therein an elongated slot 69 for receiving a crank pin 70 projecting axially outwardly from the crank arm 53 in axially offset relation to the valve stem 31.

It will be apparent that linear movement of the pin guide member 64 between the leg members 60 and 61 in a direction transverse to the axis of the valve stem 31 will be translated into rotary movement of the valve stem by means of the crank pin 70 riding within the slot 69 formed in the pin drive plate 68. The leg members 60 and 61 are recessed to provide respectively a pair of spaced shoulders or stops 65 and 65a for limiting the transverse movement of the pin guide member 64 therebetween.

The pin guide member 64 is normally biased in one direction, that is, leftwardly as viewed in FIGURES 1 and 2, by means of a biasing member which in the illustrated embodiment comprises a coil spring 71 having one end 72 thereof abuttingly engaging the motive plate 67 and restrained at its opposite end 73 by means of a retaining member 74 connected at opposite ends thereof to the leg members 60 and 61.

In order to provide rightward movement of the guide member 64 as viewed in the drawings, the power unit 14 is securely mounted on the frame 59 by means of a lock ring 75 and comprises a cylindrical elongated plunger or piston member 76 which is slidably carried within a body portion 77 of the power unit 14 and extensible on an axis transverse to the axis of the valve stem 31. The piston 76 has a head portion 78 abuttingly engageable with a dish-shaped stirrup member 79 which is particularly characterized as comprising a back wall 80 at which the piston head 78 abuts, and a circumferentially continuous annularly shaped outturned flange portion 81.

As illustrated, the stirrup 79 and, in turn, the piston 76, are normally biased away from the motive plate 66 by means of a biasing member 82, which, in the illustrated embodiment, constitutes a helical coil spring having one end thereof 83 abutting the motive plate 66 and an opposite end 84 thereof abutting the circumferential flange 81 of the stirrup 79.

The force transmitting member or power unit 14 is more particularly characterized as comprising an enlarged diameter portion 86 formed in the body portion 77 and providing an enlarged internal chamber which is divided into a pair of smaller chambers 87 and 88 by means of a flexible diaphragm 89.

A rubber plug 90 is positioned within the chamber 88 between the diaphragm 89 and the piston 76 for transmitting movement therebetween, and the chamber 87 is filled with the same incompressible liquid which fills the control circuit 13 and is connected in fluid communication thereto by means of a conduit 91.

The temperature sensitive actuator indicated generally by the reference numeral 16 is of a type well known in the art and comprises a body member 92 having an enlarged portion 93 which forms an enlarged internal chamber which is divided into a pair of smaller chambers 94 and 96 by means of a flexible diaphragm 97. The chamber 96 contains material which is expansible under temperature increase and chamber 94 contains the same incompressible liquid which fills the control circuit 13, and is in fluid communication therewith.

It will now be appreciated that an increase in the temperature ambient the temperature sensitive actuator 16 will cause the expansible material in chamber 96 thereof to expand, thereby flexing the diaphragm 97 and increasing the pressure of the liquid in chamber 94, thereby increasing the pressure in the chamber 87 of the power unit 14 and flexing the diaphragm 89 thereof against the piston 76 to urge the stirrup member 79, the coil spring 82 and the pin guide member 64 rightwardly in opposition to the biasing force of the coil spring 71, with simultaneous corresponding rotation of the valve stem 31 in one direction. A reduction in temperature ambient the actuator 16 has the effect of allowing leftward movement of the stirrup 79 to decrease the biasing force of the coil spring 82, thereby providing leftward movement of the pin guide member 64 in response to the biasing force of the coil spring 71, and a corresponding rotation of the valve stem 31 in an opposite direction.

It will be noted that the power unit 14, the fluid control circuit 13 and the actuator 16 comprise a "sealed" or non-adjustable valve control apparatus, responsive only to variations in temperature ambient the actuator 16. As a consequence, for any given temperature surrounding the actuator 16 the valve mechanism will be positioned to provide a predetermined flow therethrough. However, variations in certain parameters such as the temperature of the liquid heating or cooling medium being controlled by the valve may preclude the given setting of the valve mechanism at a given temperature ambient the actuator 16 from furnishing the optimum flow therethrough to provide a comfortable temperature in the conditioned space for the occupant thereof.

It is, therefore, within the scope of the present invention to provide means for manually controlling or regulating the setting of the valve mechanism and the fluid flow therethrough for any given temperature ambient the actuator 16, and to this end there is provided a generally U-shaped bracket member 98 situated essentially inversely with respect to the frame 59 and comprising a pair of elongated spaced parallel leg members 99 and 100 extending from a back wall or bight portion 101 and connected in fixed assembly respectively at end portions 102 and 103 thereof to the flange portion 81 of the stirrup 79. It will be noted that the motive plates 66 and 67 are recessed respectively as at 104 and 106 to support the bracket member 98 for slidable axial movement thereof.

The purpose of the bracket member 98 is to position the pin guide member 64 relative to the piston 76 of the power unit 14 for any given temperature ambient the actuator 16, and to this end a threaded aperture 107 is formed in the back wall 101 of the bracket 98 for receiving a complementarily threaded stud or bolt 108 having an end portion 109 thereof adapted to abut the motive plate 67 of the pin guide member 64 and also having a manual adjustment knob 110 attached thereto for threading the bolt 108 toward or away from the motive plate 67.

It will now be apparent that manual adjustment of the bolt member or stud 108 will position the pin guide member 64 with respect to the stirrup 79 for any given position of the stirrup and, in turn, for any given temperature ambient the actuator 16. In this connection, the occupant of the conditioned zone can effectively controlled the temperature within the zone regardless of change in temperature of the liquid heating or cooling medium, capacity of the heat transfer apparatus and the like parameters. However, for any given condition, the remotely positioned temperature sensitive actuator 16 will effectively modulate or control the flow through the valve so as to maintain the temperature in the conditioned space substantially constant.

It will be appreciated that the spring 82 also acts as an overtravel spring to accommodate rightward movement of the piston 76 when the pin guide member 64 is in abutting engagement with the shoulders or stops 65a.

In order to provide visual indication of the position of adjustment of the bolt 108, an indicating arm 111 is provided having a collar portion 112 apertured to be received in a cirmumferential groove 113 formed in the periphery of the bolt 108 for axial movement therewith, and includes a pair of finger members 114 and 116 extending parallel to the legs of the bracket member 98 and having respectively a projection or pointer 117 extending therefrom. Suitable indicia such as a plurality of spaced lines at 118 may be formed on the legs of the bracket member to provide a reading of the axial position of the bolt 108 relative to the bracket member 98.

Although minor modifications might be suggested by those versed in the art, it should be understood that I wish to embody within the scope of the patent warranted hereon all such modifications as reasonably come within the scope of my contributions to the art.

I claim as my invention:

1. A fluid flow control valve comprising
    a valve body having an inlet, an outlet and a passage communicating said inlet and said outlet,
    a valve seating member in said passage having an aperture formed therein for establishing flow through said passage,
    a valve member situated in said passage and adjacent said seating member and rotatable relative thereto for closing said aperture,
    an elongated valve stem rotatably mounted on said valve body,
        said stem having a first portion extending into said passage and being fixedly connected to said valve member for corotation therewith and having a second portion extending outwardly of said valve body,
    a radially extending crank arm fixedly connected to said second portion of said valve stem and having an axially extending pin member formed thereon in axial offset relation with respect to said valve stem,
    a force transmitting assembly mounted on said valve body and comprising,
        an assembly frame fixedly connected to said valve body,
        a pin guide member slidably mounted for translatory movement on said frame and engaging said pin member for imparting rotatable movement thereto in response to translatory movement thereof, first biasing means connected to said frame and said guide member for urging said guide member in one direction, second biasing means connected to said guide member for urging said guide member in an opposite direction, and force transmitting means mounted on said frame and connected to said second biasing means for varying the biasing force of said second biasing means,
    temperature sensitive actuating means remote from said valve body and connected to said force transmitting means for actuating said force transmitting means in response to temperature ambient said temperature sensitive means, and manually adjustable means interconnecting said force transmitting means and said guide member for selectively adjusting the biasing force of said second biasing means at any given temperature ambient said temperature sensitive actuating means.

2. A fluid flow control valve comprising,
    a valve body having an inlet, an outlet and a cylindrical passage communicating said inlet and said outlet, a valve seating member in said passage having a seating surface disposed substantially transversely to said passage, an aperture formed axially in said seating member for establishing a flow path through said passage, a valve member situated in said passage adjacent said seating member and having a complemental seating surface in slidable abutting engagement with said seating surface of said seating member, said valve member being rotatable relative to said seating member for closing said aperture to close said flow path, an elongated valve stem rotatably mounted on said valve body and having a first portion extending into said passage and fixedly connected to said valve member for corotation therewith and having a second portion extending outwardly of said valve body, a shoulder formed on said second portion of said valve stem in spaced relation to said valve body, a first spring member interposed between said shoulder and said valve body for imparting an outward bias to said valve stem for maintaining the seating surfaces of said valve member and said seating member in leak-proof abutting relation, a radially extending crank arm fixedly connected to said second portion of said valve stem and having an axially extending pin member formed thereon in axial offset relation with respect to said valve stem, a force transmitting assembly mounted on said valve body and comprising, an assembly frame fixedly connected to said valve body, a pin guide member slidably mounted on said frame for translatory movement thereof and engaging said pin member for imparting rotatable movement thereto in response to translatory movement thereof, a second spring member interconnecting said frame and said guide member for urging said guide member in one direction, a third spring member connected to said guide member for urging said guide member in an opposite direction, and force transmitting means interconnecting said frame and said third spring member for varying the biasing force of said third spring member, temperature sensitive actuating means remote from said valve body and connected to said force transmitting means for actuating said force transmitting means in response to temperature ambient said temperature sensitive means, and manually adjustable means interconnecting said force transmitting means and said guide member for selectively adjusting the biasing force of said third spring member for any given temperature ambient said temperature sensitive actuating means.

3. A fluid flow control valve comprising a valve body having an inlet, an outlet and a passage communicating said inlet and said outlet, a rotatable valve member and valve seat in said passage for controlling fluid flow therethrough, a valve stem having a crank arm fixedly connected to said valve member, a force transmitting assembly mounted on said valve body and comprising a translatorily movable guide member connected to said crank arm for imparting rotatable movement to said valve member in response to translatory movement of said guide member, and first and second biasing means biasing said guide member in one direction and in an opposite direction, respectively, force transmitting means for varying the biasing force of one of said biasing means, temperature sensitive actuating means remote from said valve body and connected to said force transmitting means for actuating said force transmitting means in response to temperature ambient said temperature sensitive means, and manually adjustable means for selectively adjusting the biasing force of the other of said biasing means.

4. The fluid flow control valve as defined in claim 3 and including means comprising suitable indicia and a relatively movable pointer providing a visual indication of the adjustment of said manually adjustable means.

References Cited by the Examiner

UNITED STATES PATENTS

| | | | |
|---|---|---|---|
| 862,985 | 8/1907 | Minter | 137—625.31 X |
| 2,221,347 | 11/1940 | Giesler | 236—98 X |
| 2,527,622 | 10/1950 | Dibert | 236—99 |
| 2,557,035 | 6/1951 | Lichty | 236—99 X |
| 2,564,438 | 9/1951 | Landon. | |
| 2,663,499 | 12/1953 | Schutt | 236—42 |
| 2,815,035 | 12/1957 | Eskin et al. | |
| 2,925,986 | 2/1960 | Woods | 236—99 X |
| 2,973,181 | 2/1961 | Johnson | 251—172 |

ALDEN D. STEWART, *Primary Examiner.*